United States Patent [19]
Kawano et al.

[11] Patent Number: 5,621,706
[45] Date of Patent: Apr. 15, 1997

[54] METHOD AND APPARATUS FOR MAGNETIC SUPER-RESOLUTION RECORDING

[75] Inventors: Toshifumi Kawano; Hidetaka Ito, both of Yokohama, Japan

[73] Assignee: Mitsubishi Chemical Corporation, Tokyo, Japan

[21] Appl. No.: 343,007

[22] Filed: Nov. 21, 1994

[30] Foreign Application Priority Data

Nov. 24, 1993 [JP] Japan .................................. 5-293549
Mar. 24, 1994 [JP] Japan .................................. 6-053525
Mar. 24, 1994 [JP] Japan .................................. 6-053526
Mar. 24, 1994 [JP] Japan .................................. 6-053527

[51] Int. Cl.$^6$ ...................................... G11B 13/04
[52] U.S. Cl. .................. 369/13; 369/275.2; 369/14
[58] Field of Search ..................... 369/13, 275.2, 369/14, 110; 360/59, 14

[56] References Cited

U.S. PATENT DOCUMENTS 5,461,595  10/1995  Machida ..................................... 369/13
5,486,395   1/1996  Murakami et al. ....................... 369/13

FOREIGN PATENT DOCUMENTS

0415449A2   3/1991  European Pat. Off. .
0498461A2   8/1992  European Pat. Off. .
0509836A2  10/1992  European Pat. Off. .

Primary Examiner—David C. Nelms
Assistant Examiner—Vu A. Le
Attorney, Agent, or Firm—David G. Conlin; Milton Oliver

[57] ABSTRACT

The disclosure describes a magneto-optical recording medium comprising a substrate and a magnetic layer comprising at least a readout layer, a cut-off layer and a memory layer disposed on said substrate in order, said magnetic layer having the properties that when said magnetic layer is heated by irradiation of readout beams for readout of information, a sub-lattice magnetization direction of at least the layer concerned with readout in said magnetic layer at the high-temperature region is reversed relative to the magnetization direction at the low temperature of said region, and when the temperature of the magnetic layer lowers after passage of the readout beams, the sub-lattice magnetization direction is restored; and a recording and readout method of the magneto-optical recording medium.

27 Claims, 4 Drawing Sheets

# METHOD AND APPARATUS FOR MAGNETIC SUPER-RESOLUTION RECORDING

BACKGROUND OF THE INVENTION

The present invention relates to a magneto-optical recording medium and a method of reading-out the same.

Magneto-optical recording media are popularly used as a high-density and low-cost rewritable information recording medium. Especially, those having a recording layer composed of an amorphous alloy of a rare earth metal and a transition metal, show very excellent recording characteristics.

The magneto-optical disc is a recording medium with a very large capacity, but further large capacity storage is required with the advance of the increasing amount of information in our society.

The recording density of an optical disc is usually determined by the size of the readout beam spot. Since the spot size can be lessened by shortening the laser wavelength, studies are being made for shortening the laser wavelength, but great difficulties are involved in attaining this object.

On the other hand, various attempts such as a super resolution technique have been made in recent years for obtaining a higher resolution than determined by laser wavelength.

One of the noticeable proposals is a "magnetically induced super resolution system" (hereinafter referred to as MSR system) which makes use of the exchange coupling force working between the multiple layers in a magneto-optical disc. In one form of this system, there is used a recording medium having an exchange-coupled magnetic layer comprising a readout layer with small coercive force, a cut-off (switching) layer with a low Curie temperature and a memory layer with a high Curie temperature and a large coercive force. When the medium is heated by readout beams while applying a readout magnetic field, the exchange coupling is interrupted at the high-temperature region of the medium. Since the readout layer per se is small in coercive force, the magnetization is oriented in the direction of readout magnetic field in the high-temperature region, thereby erasing the recording bits. Consequently, the low-temperature region alone is read out. Thus, since the readout area is actually narrowed, there is obtained the same effect as when the readout beams are off, allowing readout of high-density recording bits.

The erased recording bits are revived since the recording bits are transferred from the memory layer when the medium temperature lowers to restore exchange coupling. This system is called "front aperture detection system (FAD system)" as the signal is detected in front of the readout beam spot.

A drawback to this FAD system is that a readout magnetic field (Hr) is required for readout. Usually a readout magnetic field of not less than 24,000 A/m is required, and since the readout is conducted in the presence of such readout magnetic field of not less than 24,000 A/m, the bits recorded in the memory layer tend to become unstable.

Also, it is liable that a stronger magnetic field than necessary magnetic field for recording would be required for readout. This becomes a serious problem in the attempts at miniaturizing the magnetic head and simplifying of the apparatus. Especially, in the magnetic field modulation recording, the recording magnetic field is mostly less than 10,000 A/m and the application of the readout magnetic field gives rise to serious problems.

Thus, there has been strong demand for the realization of a super resolution-type magneto-optical recording medium capable of providing a high C/N (Carrier/Noise) ratio with no need of applying a readout magnetic field, and a method for readout of such recording medium.

The realization of a magneto-optical recording medium having a memory layer which possesses antithetical properties of being capable of generating a high magneto-static field (properties as a magnet) and being high in perpendicular magnetic anisotropy, according to which there is no possibility that the perpendicular magnetic anisotropy of the memory layer be reduced by high magnetization for reversing the magnetization direction of the readout layer in the magneto-static field to cause slanting of the magnetization direction, nor is the possibility of producing a minute reversal region in the magnetic domain in the memory layer.

Another means for realizing the large capacity storage is use of a pulse width modulation (PWM) recording system. For optical disc recording, there have been conventionally used a pulse position modulation (PPM) recording system in which the pulse position interval is detected, but according to the PWM recording system, the pulse end interval is detected and approximately 1.5 times mass capacity storage is realized.

A drawback to the PWM recording system is difficulty in making accurate detection of pulse ends. There are two methods for pulse end detection, for example, a method comprising setting a certain slice level and detecting a signal as a pulse end when the signal crosses that level; other method comprising second order-differentiating each signal.

The detection by the slice level system is mostly employed for optical disc recording because the detection by the second order differentiation system suffers a drop of the S/N (Signal/Noise) ratio of signals due to differentiation.

The slice level system, however, is at a disadvantage in that it is sensitive to level variation of the whole signals.

Also, when a PPM system disc is read out with the same drive, it is necessary to use a readout signal detection system in a dual way.

Further, the conventional PPM recording has involved the trouble of differentiating signals for peak detection.

As a result of intensive studies for overcoming the above related art problems, it has been found that by conducting the readout of a magneto-optical recording medium by reversing a sub-lattice magnetization direction of a readout layer at a high-temperature region by heating the magneto-optical recording medium with readout beams without applying any magnetic field, the magneto-optical recording medium comprising a substrate and an exchange-coupled magnetic layer comprising at least the readout layer, a cut-off (switching) layer and a memory layer disposed on a substrate in order, wherein the Curie temperature ($T_{c1}$) of the said readout layer, the Curie temperature ($T_{c2}$) the said cut-off layer and the Curie temperature ($T_{c3}$) of the said memory layer satisfy the following relations:

$$T_{c1} > T_{c2} \geqq 50° \text{ C.} \tag{1}$$

$$T_{c3} > T_{c2} \tag{2}$$

and the said recording medium has the specific properties that when the said magnetic layers are heated to a temperature close to $T_{c2}$ or higher by readout beams, the exchange coupling force between the memory layer and the readout layer is decreased to or becomes nil and the sub-lattice magnetization direction of the readout layer at the high-temperature region heated to a temperature close to $T_{c2}$ or higher is reversed relative to the magnetization direction at the low (pre-irradiation) temperature of the said region, and when the temperature of the magnetic layer lowers after passage of the readout beams, the original magnetization direction is restored, it is possible to obtain a super resolution effect and a high C/N ratio with no need of using a readout magnetic field unlike the conventional systems using a mask. The present invention has been attained on the basis of these findings.

SUMMARY OF THE INVENTION

An object of the present invention is to provide a super resolution-type magneto-optical recording medium which is capable of expressing a high C/N ratio without applying any readout magnetic field, and a readout method thereof.

Another object of the present invention is to provide a magneto-optical recording medium having the specific magnetic characteristics, the said recording medium having excellent readout properties and capable of producing a super resolution effect in a way different from the conventional principle using a mask, in which a magnetization direction at a high-temperature region is reversed without applying a readout magnetic field for readout, and a readout method thereof.

Still another object of the present invention is to provide a magneto-optical recording medium having a bias layer adjacent to a memory layer, the said medium having excellent readout properties and capable of producing a super resolution effect in a way different from the conventional principle using a mask, in which a magnetization direction at a high-temperature region is reversed without using a readout magnetic field for readout, and a readout method thereof.

Other object of the present invention is to provide a readout method of a magneto-optical recording medium to which signals are detected and information is read out in a simpler way than the conventional method in PPM or PWM recording, by directly taking out differential signals from the medium which is capable of producing a super resolution effect in a way different from the conventional principle using a mask, in which a magnetization direction at a high-temperature region is reversed without using a readout magnetic field for readout.

To accomplish the aims, in a first aspect of the present invention, there is provided a magneto-optical recording medium comprising a substrate and a magnetic layer comprising a readout layer, a cut-off (switching) layer and a memory layer disposed on the said substrate in order, the said magnetic layer having the properties that when the said magnetic layer is heated by irradiation of readout beams for reading out information, a sub-lattice magnetization direction of at least the layer concerned with readout in the said magnetic layer at the high-temperature region is reversed relative to the magnetization direction at the low temperature of the said region, and when the temperature of the said magnetic layer lowers after passage of the readout beams, the magnetization direction of the sub-lattice magnetization is restored.

In a second aspect of the present invention, there is provided a magneto-optical recording medium comprising a substrate and an exchange-coupled magnetic layer comprising at least a readout layer, a cut-off (switching) layer and a memory layer disposed on the said substrate in order, each of which is composed of an alloy of a rare earth metal and a transition metal, the Curie temperatures of the said readout layer, cut-off layer and memory layer satisfying the following relations:

$$T_{c1} > T_{c2} \geqq 50° C. \qquad (1)$$

$$T_{c3} > T_{c2} \qquad (2)$$

wherein $T_{c1}$ represents Curie temperature of the readout layer, $T_{c2}$ represents Curie temperature of the cut-off layer and $T_{c3}$ represents Curie temperature of the memory layer; and the said magnetic layer having the properties that when the magnetic layer is heated to a temperature close to $T_{c2}$ or higher by readout beams, an exchange coupling force between the memory layer and the readout layer is decreased or becomes nil and a sub-lattice magnetization of at least the magnetic layer concerned with readout in a high-temperature region heated to $T_{c2}$ or higher is reversed relative to the magnetization direction at the low temperature of the said region, and when the temperature of the magnetic layer lowers after passage of readout beams, the magnetization direction of the sub-lattice magnetization is restored.

In a third aspect of the present invention, there is provided a magneto-optical recording medium comprising a substrate and an exchange-coupled magnetic layer comprising a readout layer, a cut-off (switching) layer and a memory layer disposed in order, each of which is an alloy of a rare earth metal and a transition metal, the Curie temperatures of the said readout layer, cut-off layer and memory layer satisfying the following relations:

$$T_{c1} > T_{c2} \geqq 50° C. \qquad (1)$$

$$T_{c3} > T_{c2} \qquad (2)$$

wherein $T_{c1}$ represents Curie temperature of the readout layer, $T_{c2}$ represents Curie temperature of the cut-off layer and $T_{c3}$ represents Curie temperature of the memory layer; and the said magnetic layer having the properties that when the magnetic layer is heated to a temperature close to $T_{c2}$ or higher by irradiation of readout beams, an exchange coupling force between the memory layer and the readout layer is decreased or becomes to nil and consequently the sub-lattice magnetization direction of the readout layer at a high-temperature region is reversed relative to the magnetization direction at the low temperature of the said region, that, at $T_{c2}$ when the magnetization of the rare earth metal is dominant in the readout layer, the magnetization of the transition metal is dominant in the memory layer, or when the magnetization of the transition metal is dominant in the readout layer, then magnetization of the rare earth metal is dominant in the memory layer, and that the magnetization of the memory layer is not less than 80 emu/cc at $T_{c2}$ and not more than 300 emu/cc at room temperature, and the magnetization of the readout layer is not less than 150 emu/cc at $T_{c2}$ and not more than 500 emu/cc at room temperature.

In a fourth aspect of the present invention, there is provided a magneto-optical recording medium comprising a substrate and an exchange-coupled magnetic layer comprising a readout layer, a cut-off (switching) layer, a bias layer and a memory layer disposed in order, each of which is an alloy of a rare earth metal and a transition metal, the Curie temperatures of the said readout layer, cut-off layer, bias layer and memory layer satisfying the following relations:

$$T_{c1} > T_{c2} \geq 50° C. \quad (1)$$

$$T_{c3} > T_{c2} \quad (2)$$

$$T_{c4} > T_{c2} \quad (3)$$

wherein $T_{c1}$ represents Curie temperature of the readout layer, $T_{c2}$ represents Curie temperature of the cut-off layer, $T_{c3}$ represents Curie temperature of the memory layer and $T_{c4}$ represents Curie temperature of the bias layer; and the said magnetic layer having the properties that when the magnetic layer is heated to a temperature close to $T_{c2}$ or higher by readout beams, an exchange coupling force between the memory layer and the readout layer is decreased or becomes to nil and consequently the sub-lattice magnetization direction of the readout layer at the high-temperature region is reversed relative to the magnetization direction at the low temperature of the said region, and that, at $T_{c2}$ the bias layer is exchanged-coupled with the memory layer and has a higher magnetization than that of the memory layer.

In a fifth aspect of the present invention, there is provided a magneto-optical recording medium comprising a substrate and an exchange-coupled magnetic layer comprising at least a readout layer, a cut-off layer and a memory layer disposed on said substrate in order, each of which is composed of an alloy of a rare earth metal and a transition metal, the Curie temperatures of said readout layer, cut-off layer and memory layer satisfying the following relations:

$$T_{c1} > T_{c2} \geq 50° C. \quad (1)$$

$$T_{c3} > T_{c2} \quad (2)$$

wherein $T_{c1}$ represents Curie temperature of the readout layer, $T_{c2}$ represents Curie temperature of the cut-off layer, and $T_{c3}$ represents Curie temperature of the memory layer;

said magnetic layer having the properties that when the magnetic layer is heated to a temperature close to $T_{c2}$ or higher by readout beams, an exchange coupling force between the memory layer and the readout layer is decreased or becomes to nil and a sub-lattice magnetization of at least the magnetic layer concerned with readout at the high-temperature region heated to a temperature close to $T_{c2}$ or higher is reversed relative to the magnetization direction at the low temperature of said region, and when the temperature of the magnetic layer lowers after passage of the readout beams, the sub-lattice magnetization direction is restored;

the magnetization of the rare earth metal in the readout layer being dominant at $T_{c2}$ and the magnetization of the transition metal in the memory layer being dominant at $T_{c2}$, or the magnetization of the transition metal in the readout layer being dominant at $T_{c2}$ and the magnetization of the rare earth metal in the memory layer being dominant at $T_{c2}$;

the readout layer having a coercive force of not less than 2,000 A/m at $T_{c2}$, a perpendicular magnetic anisotropy of $2 \times 10^{-5}$ to $8 \times 10^6$ erg/cc at $T_{c2}$, a magnetization of not less than 100 emu/cc at $T_{c2}$ and a magnetization not more than 500 erg/cc at room temperature; and the memory layer having a magnetization of not less than 80 emu/cc at $T_{c2}$ and a magnetization of not more than 300 emu/cc at room temperature.

In a six aspect of the present invention, there is provided a readout method of a magneto-optical recording medium, which comprises using a magneto-optical recording medium set forth in the first or second aspect, and irradiating readout beams to the magneto-optical recording medium without applying a magnetic field so that a sub-lattice magnetization of at lease the layer concerned with readout at a high-temperature region is reversed relative to the magnetization direction at the low temperature of said region.

In a seventh aspect of the present invention, there is provided a readout method of a magneto-optical recording medium, which comprises using a magneto-optical recording medium set forth in the third or fourth aspect, and irradiating readout beams to the magneto-optical recording medium so as to cause reversal of a sub-lattice magnetization of at least the readout layer forming a part of the readout section while applying a readout magnetic field of not more than 16,000 A/m or without applying such readout magnetic field.

In a eighth aspect of the present invention, there is provided a recording and readout method of magneto-optical recording medium, which comprises reading out information using a magneto-optical recording medium set forth in the first or second aspect, in which an information is stored by upwardly or downwardly directed magnetization, and when a portion of the medium is heated by readout beams and elevated in temperature, the heated region makes Kerr rotation in the direction opposite to that caused at the low temperature of said portion, and when said portion is cooled with passage of readout beams, the original direction of Kerr rotation is restored, and using a readout power capable of generating a substantially equal signal level no matter whether magnetization is upwardly directed or downwardly directed when a magnetic domain covering the whole range of the readout beam spot is read out.

DETAILED DESCRIPTION OF THE INVENTION

Figure 1A:
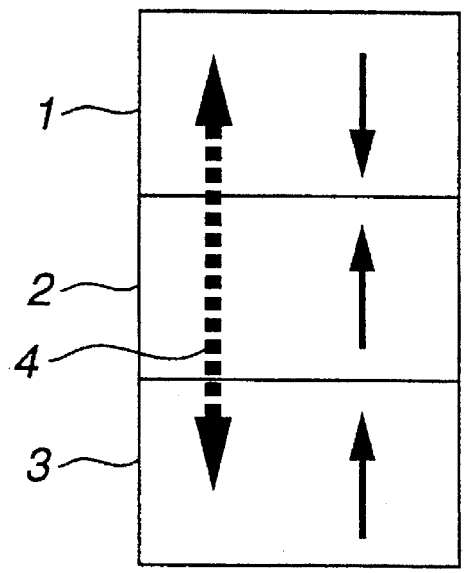
FIG. 1 (a) is a structural illustration of the readout system using a magneto-optical recording media according to the present invention at a temperature of less than $T_{c2}$ and FIG. 1 (b) is a structural illustration of the readout system using the magneto-optical recording media at a temperature of more than $T_{c2}$.

In carrying out recording on the magneto-optical recording medium according to the present invention, the medium is first exposed to continuous beams while applying a magnetic field in a fixed direction to orient magnetization in one direction (erasure).

Then the pulse beams corresponding to the information are irradiated while applying a magnetic field in the opposite direction, thereby forming a magnetic domain with opposite magnetization direction (recording).

It is possible to employ a magnetic field modulation recording system in which a modulation corresponding to the information is given to the recording magnetic field.

In the present invention, when the readout beams are irradiated for reading out the recording, a sub-lattice magnetization direction of at least the layer concerned with readout in the medium is reversed. In readout of the conventional magneto-optical recording medium, when the interval between the magnetic domains is shortened down, the recording signal and the erasing signal (for example, N pole signal and S pole signal) counteract each other, making it unable to distinguish one signal from the other, resulting in a drop of signal level.

On the other hand, according to the magneto-optical recording medium of the present invention, since the sub-lattice magnetization direction at the high-temperature region is reversed, the signal obtained from the said region by its Kerr rotation is also reversed in polarity. Therefore, in case where there is the recording signal (e.g. S pole signal) in the high-temperature region, since the said signal is reversed, it becomes identical with the peripheral erasing signal (e.g. N pole signal), so that with both signals combined, a high signal level is obtained. In case where there is the erasing signal mode (e.g. N pole signal) in the high-temperature region, since the said signal is reversed, it becomes identical with the peripheral recording signal, so that in this case, too, a high signal level is obtained.

Also, in the magneto-optical recording medium of the present invention, since the magnetization reversal occurs only at the high-temperature region of the readout spot, there can be obtained sharp readout signals with a very narrow width as compared with the conventional magneto-optical recording medium in which the whole readout spot is concerned with signals, and thus even fine recording can be easily read out.

For causing such reversal of the sub-lattice magnetization direction at the high-temperature region, a magneto-optical recording medium having a specified constitution below is preferably used.

A magneto-optical recording medium in which an exchange-coupled magnetic layer comprising at least a readout layer, a cut-off (switching) layer and a memory layer is disposed on a substrate, and the Curie temperatures of the said readout layer, cut-off layer and memory layer satisfy the following relations:

$$T_{c1} > T_{c2} \geq 50° C. \quad (1)$$

$$T_{c3} > T_{c2} \quad (2)$$

wherein $T_{c1}$ represents Curie temperature of the readout layer, $T_{c2}$ represents Curie temperature of the cut-off layer and $T_{c3}$ represents Curie temperature of the memory layer.

$T_{c1}$, $T_{c2}$ and $T_{c3}$ are all set to be not less than 50° C. for the reason that the temperature in the use environment of the medium is usually below 50° C.

When the readout beams are irradiated for readout of records, a super resolution effect can be obtained by reversing the sub-lattice magnetization direction of at least the layer concerned with readout in the medium. The medium capable of producing a super resolution effect has three layers comprising a readout layer, a cut-off layer and a memory layer. Its operating principle of the super resolution produced using the above-mentioned medium is explained below with reference to FIGS. 1 to 3.

In FIG. 1 (a), in case where the readout layer 1 and the memory layer 3 are each composed of a ferromagnetic alloy of a rare earth metal and a transition metal, and the dominant sub-lattice magnetization directions of the said layers are different from each other, with an exchange coupling force 4 at a temperature of less than $T_{c2}$ being strong, the magnetization directions of said layers are stabilized opposing to each other by virtue of the exchange coupling force 4.

When this medium is heated by readout beams 8, the exchange coupling force 4 between the memory layer 3 and the readout layer 1 is decreased or becomes to nil at around the Curie temperature $T_{c2}$ of the cut-off layer 2.

Figure 1B:
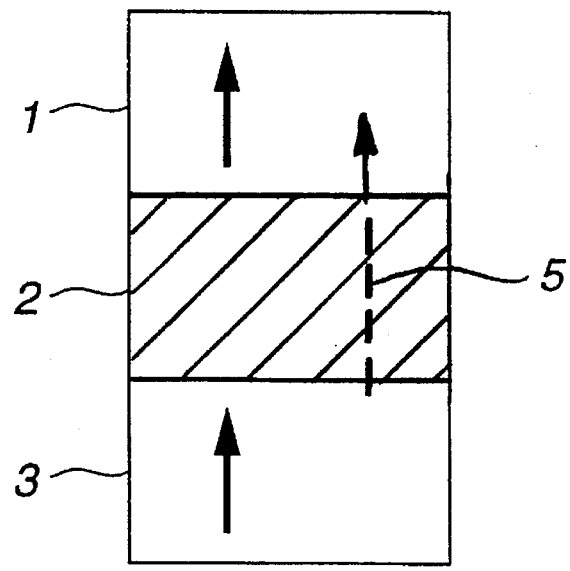

The force working for magnetization of the readout layer 1 at this stage is mostly the force of magneto-static coupling 5 caused by magnetization between the memory layer 3 and the readout layer 1 (FIG. 1(b)).

In case the dominant sub-lattice magnetization directions of the memory layer 1 and the readout layer 3 are different from each other at $T_{c2}$, the exchange coupling force 4 and the magneto-static force 5 are opposed to each other in direction, so that, by virtue of said magneto-static force 5, the sub-lattice magnetization direction of the readout layer 1 is reversed vis-a-vis the situation where the exchange coupling force 4 at the low temperature is dominant. It is desirable in the present invention to use magneto-static coupling for causing magnetization reversal in a stabilized way. It is desirable therefor that the memory layer and the readout layer are different in dominant sub-lattice magnetization direction at $T_{c2}$. Specifically, it is desirable that when the magnetization of the rare earth metal is dominant in the memory layer 3 at $T_{c2}$, the magnetization of the transition metal is made dominant in the readout layer 1, and when the magnetization of the transition metal is dominant in the memory layer 3, then the magnetization of the rare earth metal is made dominant in the readout layer 1.

For effecting the stable magnetization reversal by magneto-static coupling, it is desirable that the memory layer 3 generates a sufficiently large magnetic field corresponding to the recording bits at $T_{c2}$. To this aim, the memory layer 3 is required to have magnetization of a certain level or higher. The magnetization of the memory layer 3 needs to be not less than 80 emu/cc at $T_{c2}$.

However, in case the magnetization of the memory layer 3 is too high at room temperature, there may be formed a reversed minute magnetic domain in the inside of the memory layer 3 or a drop of the magnetic anisotropy may take place, making it unable to plumb up the magnetization of the readout layer 1 with perfect perpendicularity, so that the magnetization of the memory layer should be not more than 300 emu/cc at room temperature.

The magnetization of the memory layer is preferably not less than 120 emu/cc, more preferably not less than 150 emu/cc at $T_{c2}$, and it is preferably not more than 250 emu/cc, more preferably not more than 200 emu/cc at room temperature. Here, "room temperature" refers to a temperature of the working environment, and it is typically 25° C.

On the other hand, the force exerting to the readout layer 1, too, influences on the magnetization of the layer. It is, therefore, preferable that the readout layer 1, too, has magnetization of a certain level or higher at $T_{c2}$. The preferred magnetization of the readout layer 1 at $T_{c2}$ is not less than 100 emu/cc, more preferably not less than 150 emu/cc, even more preferably not less than 200 emu/cc, still more preferably not less than 250 emu/cc.

In case where the magnetization of the readout layer is too high at room temperature, when the readout layer is exchange-coupled with the memory layer 3, there may take place the undesirable phenomena, for example, the memory layer 3 may fail to have perfectly perpendicular magnetization or its magnetization direction may be reversed locally under the influence of the readout layer 1 with low perpendicular magnetic anisotropy.

The preferred magnetization of the readout layer 1 at room temperature is not more than 500 emu/cc, more preferably not more than 450 emu/cc, even more preferably not more than 400 emu/cc.

When the memory layer 3 is of a composition in which the magnetization of the rare earth metal is dominant till reaching $T_{c2}$, the recording properties such as write field dependence of the medium are deteriorated. It is, therefore, preferable that the readout layer 1 is made of a composition in which the magnetization of the rare earth metal is dominant. For making the magnetization of the rare earth metal dominant in the readout layer 1 at $T_{c2}$, it is preferable that the compensation temperature $T_{comp}$ of the readout layer 1 is lower than $T_{c2}$ ($T_{comp} > T_{c2}$).

Also, for inducing the desired magnetization reversal, the coercive force Hc of the readout layer 1 needs to be smaller than a certain level. However, if the coercive force is too small, the deterioration of readout signal may take place, so that the coercive force (Hc) of the readout layer at $T_{c2}$ is preferably in the range of 2 to 40 kA/m.

For minimizing the energy increment in the magnetic wall by the magnetization reversal in the readout layer, it is preferable to reduce the perpendicular magnetic anisotropy of the readout layer, but if it is too small, there may result the deterioration of the readout signal, so that the perpendicular magnetic anisotropy of the readout layer at $T_{c2}$ is preferably in the range of $2 \times 10^5$ to $8 \times 10^6$ erg/cc, more preferably $5 \times 10^5$ to $6 \times 10^6$ erg/cc.

Perpendicular magnetic anisotropy can be varied by adjusting the film stress by gas pressure or other means in the film forming process. Such anisotropy is preferably in the range of $5 \times 10^8$ to $5 \times 10^9$ dyne/cm².

It is preferable that the memory layer 3 has a coercive force of not less than 800 kA/m at $T_{c2}$ for stable storage of recordings.

It is also preferable that the readout layer 1 is of a composition in which the magnetization of the rare earth metal is dominant and the perpendicular magnetic anisotropy increases with decrease of the magnetization by rise of temperature, because such a composition can minimize increase of a magnetic wall energy by the magnetization reversal and also provide a high perpendicular magnetic anisotropy at the high-temperature region, allowing obtainment of high-level readout signals.

Figure 2:
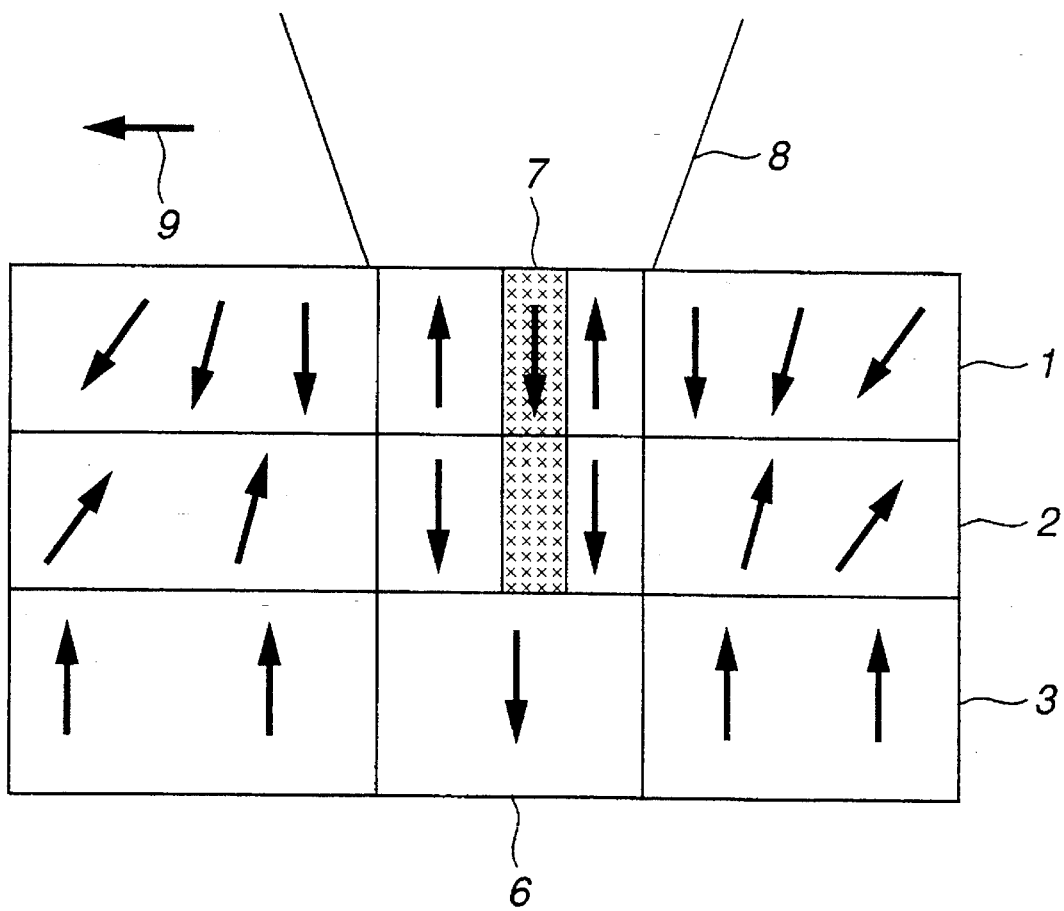
FIG. 2 is a schematic longitudinal sectional view of a magneto-optical recording medium according to the present invention.
Figure 3:
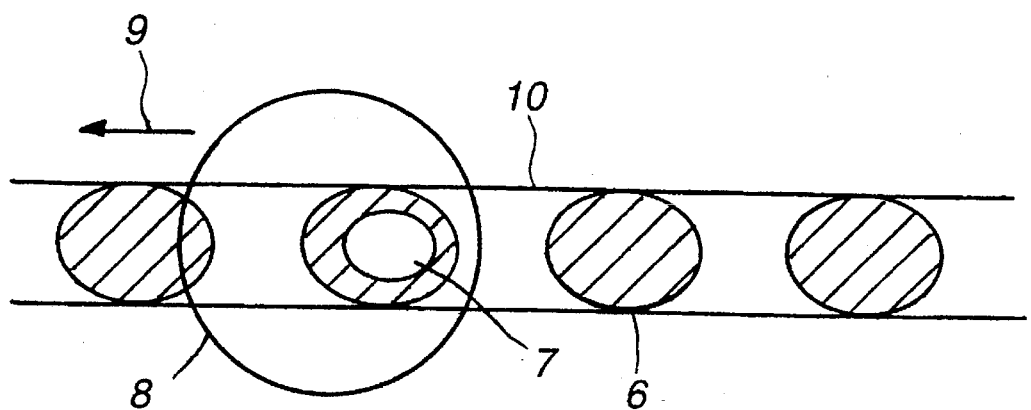
FIG. 3 is a plan illustration of a magneto-optical recording medium according to the present invention.

Further, with such a composition, the magneto-optical signal at the low-temperature region is small as shown in FIG. 2 and leakage of signal from the peripheral portion of the readout spot 8 (crosstalk) can be minimized.

Thus, it is an essential requisite for the readout layer 1 that the angle of its Kerr rotation be larger at a temperature close to $T_{c2}$ than at around room temperature at which the exchange coupling is strong.

As the material of the readout layer 1, alloys of rare earth and transition metals such as GdFeCo, GdCo, GdFe, GdDyFe, GdDyCo, GdDyFeCo, GdTbFe, GdTbCo, GdTbFeCo, DyFeCo, DyCo, TbCo, TbFeCo, TbDyFeCo and TbDyCo are preferably used. Gd-containing alloys are preferred in terms of Curie temperature and coercive force.

The Curie temperature of the readout layer is preferably not less than 250° C. Magnetic substances such as PtCo or Pt-Co superlattice may be used either singly or in lamination with alloys of rare earth and transition metals for forming the readout layer 1. The GdFeCo-based alloys capable of reducing coercive force are preferably used. Such alloys are represented by the following formula:

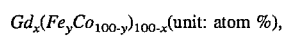

$Gd_x(Fe_yCo_{100-y})_{100-x}$ (unit: atom %), wherein $30 \leq x < 35$ and $0 \leq y < 100$.

Adjuncts such as Ti, Cr, Pt, Mo, etc., may be added in an amount not exceeding 5 atom %.

The thickness of the readout layer 1 is preferably as small as possible for receiving a greater force of magnetization. However, too small thickness causes diminution of the readout signal, so that the readout layer thickness is preferably in the range of 8 to 500 nm, more preferably 12 to 350 nm.

The cut-off layer 2 needs to be lower in Curie temperature than the readout and memory layers. The Curie temperature of the cut-off layer 2 is preferably in the range of 100° to 180° C.

The cut-off layer used in the present invention is preferably one which has high perpendicular magnetic anisotropy and is capable of exerting a strong force for magnetization of the readout layer. This cut-off layer is preferably composed of an alloy of a rare earth metal and a transition metal, such as TbFe, TbFeCo, DyFeCo, DyFe, TbDyFeCo and the like. The cut-off layer thickness is preferably in the range of 2 to 30 nm.

The memory layer 3 is a layer where recording is stored stably, and accordingly this memory layer needs to have a Curie temperature which can prevent the layer from being deteriorated by readout beams. The Curie temperature is preferably in the range of 200° to 280° C. When it is too high, the laser power required for recording becomes excessively high.

The memory layer 3 also is preferably to have a high perpendicular magnetic anisotropy for giving a strong force for magnetization of the readout layer. Specifically, the perpendicular magnetic anisotropy of the memory layer at $T_{c2}$ is preferably not less than $2 \times 10^6$ erg/cc, more preferably not less than $5 \times 10^6$ erg/cc. This layer is preferably made of a rare earth/transition metal alloy such as TbFeCo, TbCo, DyFeCo, TbDyFeCo, GdTbFe, GdTbFeCo and the like. A TbFeCo-based alloy with high perpendicular magnetic anisotropy is especially preferred. The TbFeCo-based alloy is represented by the formula:

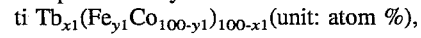

ti $Tb_{x1}(Fe_{y1}Co_{100-y1})_{100-x1}$ (unit: atom %), wherein $17 \leq x1 \leq 24$ and $70 \leq y1 \leq 85$.

Adjuncts such as Ti, Cr, Pt, Mo, etc., may be added in an amount not exceeding 5 atom %. The thickness of the memory layer 3 is preferably in the range of 10 to 50 nm. For stable storage of recording in the recording layer, it is preferable that this memory layer has a greater coercive force than the readout layer 1. The coercive force of the memory layer is preferably not less than 240 kA/m.

For effecting more stable magnetization reversal by magneto-static coupling in the magneto-static coupled super resolution recording, it is preferable that both of the memory layer and the readout layer have a fairly large magnetization with opposite polarities at around $T_{c2}$. However, when magnetization of the memory layer is elevated, there may take place a reduction of the perpendicular magnetic anisotropy to make it unable to build up the perpendicular magnetization or the minute magnetization reversal may occur.

The memory layer needs to have enough magnetization to produce a desired magneto-static field, and it is necessary to select a magnetic layer capable of providing a sufficient perpendicular magnetic anisotropy. It was difficult to find a layer composition that can well satisfy both of said requirements. When the memory layer is made of a composition in which the magnetization of the rare earth metal is dominant at $T_{c2}$, the magnetization becomes higher at around room temperature than at $T_{c2}$, so that good Layer properties may not be obtained. It is therefore preferable that the memory layer of a composition in which the magnetization of the transition metal is dominant.

Figure 4A:
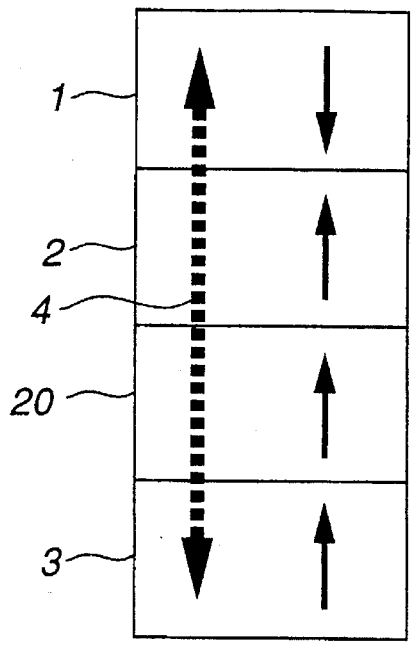
FIG. 4 (a) is a structural illustration of the readout system using another embodiment of a magneto-optical recording medium according to the present invention at a temperature of less than $T_{c2}$ and FIG. 4 (b) are structural illustrations of the readout system using the magneto-optical recording medium at a temperature of more than $T_{c2}$.
Figure 4B:
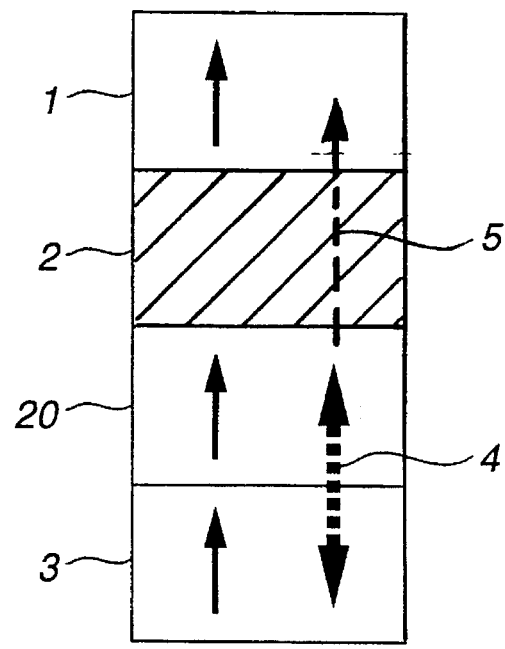

In a preferred embodiment of the present invention, a bias layer 20 capable of generating a magneto-static field for reversal may be provided adjacent to the memory layer 3 as shown in FIG. 4. The memory layer 3 and the bias layer 20 remain coupled to each other by an exchange coupling force 4 even when the cut-off layer 2 was heated not more than $T_{c2}$.

A film with low magnetization and high perpendicular magnetic anisotropy is used for the memory layer 3, while a film with higher magnetization than the memory layer 3 is used for the bias layer 20, so that a strong magneto-static field may be generated.

As the memory layer 3 and the bias layer 20 perform their respective assigned works, with the memory layer 3 generating a perpendicular magnetic anisotropy and the bias layer 20 generating a magneto-static field, it is possible to obtain a large compositional margin and to obtain good signal properties by virtue of the strong magneto-static field generated by the bias layer 20.

Further, since it is possible to employ the different polarities for the bias layer 20 and the memory layer 3, the scope of selection for the memory layer 4 is broadened.

Even if the magnetization of the bias layer is high at room temperature and the magnetization direction is not perfectly perpendicular, if the magnetization direction of the memory layer is perpendicular, it is possible to obtain good properties when the magnetization of the bias layer is lowered at around $T_{c2}$ and the magnetization direction becomes perpendicular.

A layer structure in which the bias layer is not perpendicular at low temperatures but becomes perpendicular at high temperatures is preferable since the signal level from the low-temperature region is diminished to reduce crosstalk.

When the bias layer is of a composition in which the magnetization of the transition metal is dominant at $T_{c2}$, the readout layer is of a composition in which the magnetization of the rare earth metal is dominant at $T_{c2}$. In this case, for the same reason as stated before, it is preferable that the magnetization direction of the readout layer at low temperatures is not perfectly perpendicular. The bias layer needs to have a greater magnetization than at least the readout layer for generating a magnetic field that can reverse the magnetization direction of the readout layer.

The magnetization of the bias layer is preferably not less than 150 emu/cc, more preferably not less than 200 emu/cc at $T_{c2}$. However, when the magnetization is too high, the magnetization direction may become non-perpendicular at $T_{c2}$ to cause deterioration of the signal properties, so that the magnetization is preferably below 500 emu/cc. The Curie temperature of the bias layer is preferably not less than 250° C. and its thickness is preferably in the range of 2 to 50 nm.

As the material composing the bias layer, the alloys of rare earth and transition metals such as GdFeCo, GdCo, GdFe, GdDyFe, GdDyCo, GdDyFeCo, GdTbFe, GdTbCo, GdTbFeCo, DyFeCO, DyCo, TbCo, TbFeCo, TbDyFeCo, TbDyCo and the like are preferably used. Gd-containing alloys are preferred. Use of GdFeCo is especially recommendable.

In case a bias layer is provided, it is preferable that magnetization of the memory layer is less than that of the bias layer at $T_{c2}$ and is not more than 150 emu/cc. It is also preferable that the perpendicular magnetic anisotropy of the memory layer is not less than $2\times10^6$ erg/cc.

Since the alloys of rare earth metals and transition metals are very susceptible to oxidation, it is preferable to provide a protective film on both sides of the magnetic layer.

As the material of such a protective film, silicon oxide, aluminum oxide, tantalum oxide, titanium oxide, silicon nitride, aluminum nitride, silicon carbide and the like are preferably used either singly or in proper combinations. The protective film thickness is preferably in the range of about 50 to 150 nm.

The protective film formed between the substrate and the magnetic layer, is preferably subjected to plasma etching on the surface of the substrate so as to improve magnetic anisotropy of the magnetic layer formed next thereto.

It is preferable to provide a layer of a highly heat conductive material such as Al, Cu, Au, Ag or the like in single form or an alloy based on one of such elements as a heatsink layer on the memory layer side of the magnetic layer directly or through a protective layer. This is helpful for stabilizing the heat distribution during readout. The thickness of such a heatsink layer is preferably about 10 to 100 nm.

In light intensity modulation recording, since the magnetic domain oriented in the erasing direction and the magnetic domain oriented in the recording direction differ in shape, the easiness of forming the magnetic wall in formation of a magnetic domain of reversal at a high temperature slightly differs between the recording direction and the erasing direction. Therefore, a readout magnetic field may be applied in one of the said directions during readout. It is preferably applied in the same direction as the magnetic field applied at the erasing. However, when the readout magnetic field is equal to or greater than the magneto-static field between the memory and readout layers, it influences reversal of the readout layer, so that the readout magnetic field is preferably not more than 16,000 A/m.

For readout of the magneto-optical recording medium according to the present invention, the medium is heated by irradiating readout beams in the presence or absence of a readout magnetic field of not more than 16,000 A/m to reverse the sub-lattice magnetization of the readout layer at the high-temperature region relative to the magnetization direction at the low temperature of said region.

In another method for readout according to the present invention, a magneto-optical recording medium is used in which information is stored by upwardly directed magnetization and downwardly directed magnetization, and when the medium is heated by readout beams, the heated region makes a Kerr rotation in the direction opposite to that shown at the low temperature of the said portion, and when the said region is cooled with passage of readout beams, the original direction of Kerr rotation is restored, the readout method being carried out by use of a readout power that can generate a substantially equal signal level no matter whether magnetization is upwardly directed or downwardly directed when the recording magnetic domain is read out over the whole range of the readout beam spot.

Figure 5A:
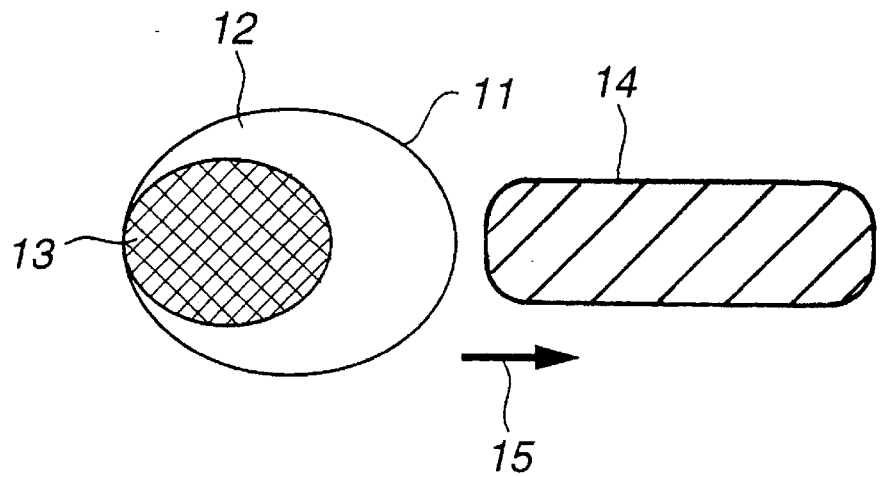
FIG. 5 (a) and FIG. 5 (b) are diagrammatic illustrations of the readout system using a magneto-optical recording medium according to the present invention.
Figure 5B:
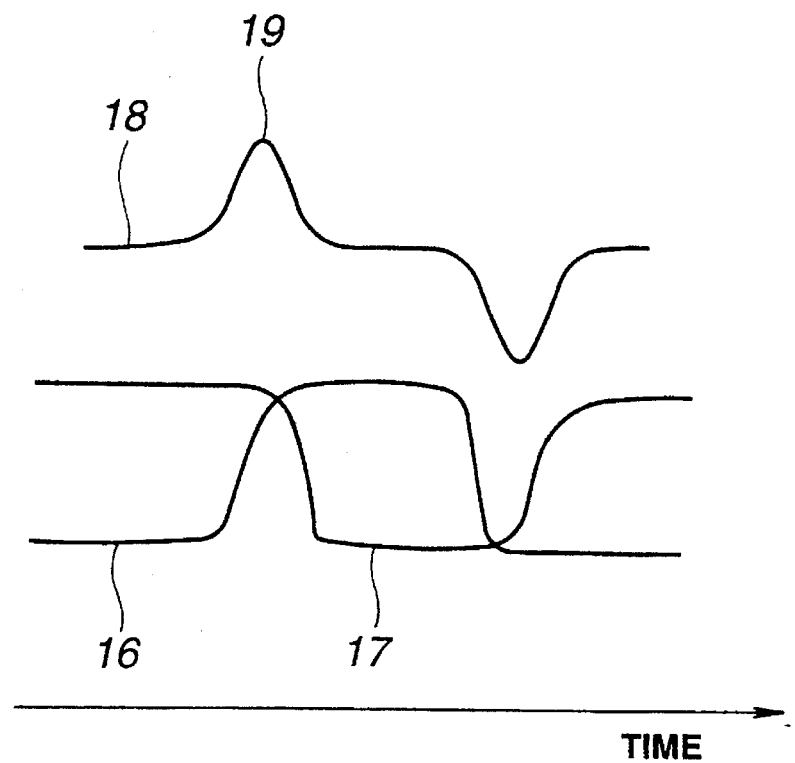

The above method is illustrated in FIG. 5. Since the magnetization reversal occurs only at the high-temperature region 13 of the readout spot 11, there can be obtained a sharp readout signal with a very narrow width and even fine recording can be easily read out as compared the conventional method in which the whole of the readout spot 11 is associated with signal.

In the course of study on such magneto-statically coupled super resolution recording medium, the present inventors found that by using this medium it is possible to directly obtain the differential waveform of readout signal obtained in ordinary readout.

Here, the signal 16 obtained from the low-temperature region 12 of the readout spot 11 is represented by f1 (t) and the signal 17 obtained from the high-temperature region 13 which caused magnetization reversal, is represented by f2(t). The actually obtained signal 18 represented by F(t), is the sum of the said both signals, as shown in the following equation (4)

$$F(t)=f1(t)+f2(t) \quad (4)$$

Signals f1 and f2 read out the magnetic domain 14 with opposite polarities to each other with a slight time difference Δt produced from the fact that the high-temperature region 13 is located slightly rearward of the low-temperature region 12. Therefore, signal f2 (t) obtained from the high-temperature region which caused magnetization reversal is represented by the following equation (5):

$$f2(t)=A(Pr)\cdot\{-f1(t-\Delta t)\} \quad (5)$$

wherein A is a factor decided by the relative values of light intensity at the low-temperature region 12 and the high-temperature region 13.

Thus, it is a function of readout power Pr which decides the size of the high-temperature region 13.

Therefore, the actually obtained signal F(t) is represented by the following equation (6):

$$F(t)=f1(t)-A(Pr)\cdot f1(t-\Delta t) \quad (6)$$

A (Pr) can be made substantially 1 by adjusting readout, and in this case, the actually obtained signal F(t) is represented by the following equation (7):

$$F(t)=f1(t)-f1(t-\Delta t) \quad (7)$$

Since Δt is a very short fixed period of time, F(t) becomes a signal of time differential of f1(t) as shown in FIG. 5. Here, f1(t) is a super resolution read-out signal issued from the low-temperature region 12 (or high-temperature region 13). Thus, even a fine recording magnetic domain can be read out accurately.

Actually, this signal can not perfectly become a differential signal due to configurational difference between the high-temperature region 13 and the low-temperature region 12, but the difference is slight and its influence takes form merely as a certain shift in signal readout and therefore poses no serious problem.

Thus, the signal can be directly taken out in the form of differential, so that in the case of PPM recording it is possible to perform signal detection corresponding to ordinary peak detection by merely detecting the position where the signal crosses the slice level.

Slice level is preferably set at zero after signal has been taken out by the AC coupling. This can unnecessitate circuit-wise differentiation of signal which has been necessary with the conventional recording media, thus simplifying the circuitry and also improving the S/N ratio.

In the case of the PWM recording, since the peak 19 of the signal coincides with the end of the magnetic domain, the signal can be read out by detecting the position of the peak 19. In this case, as in the conventional PPM recording, readout signal is subjected to first order differentiation and the location where the signal crosses the zero level is detected. However, since there exist both downwardly directed and upwardly directed peaks unlike in PPM recording, it is necessary to detect both the location where the signal crosses the zero level downwardly from above and the location where the signal crosses the zero level upwardly from below. This method, as compared with the conventional PWM detection method, is excellent in interchange ability with PPM recording and little affected by level variation of the whole signals because of peak detection. Also, because of first order differentiation in the circuit, the reduction of S/N ratio is minimized as compared with that of second order differentiation. Further, since a super resolution readout system is employed, it is possible to conduct readout with far higher density than possible with the conventional methods in both PPM and PWM recording.

For making A (Pr)=1 in the above equation (5), there is used a readout power that can generate a substantially equal signal level no matter whether the magnetization is upwardly directed or downwardly directed when the recording magnetic domain 14 is read out over the full width of the readout beam spot 11. The width of the readout beam spot 11 is selected from the range where the maximal strength of not less than $1/e^2$ is provided. It is preferable to use DC coupling for the measurement of signal level.

When actually setting a readout power, for example, the magnetic domains with a sufficiently long single frequency are recorded and a power is set so that the signal levels at the areas of the magnetic domains other than the ends thereof will become substantially equal in both the upwardly directed magnetic domain and the downwardly directed magnetic domain. In case the readout wavelength is 780 nm, recording the magnetic domains with a length of not less than about 2 μm is enough. In this case, the difference in signal level between the upwardly directed magnetic domain and the downwardly directed magnetic domain is preferably within ±20%, more preferably within ±10%.

The value of A (Pr) is changeable depending on the certain factors such as variation of the sensitivity and the variation of environmental temperature, so that it is preferable to set the optimal readout power by feeding back these factors.

By using the magneto-optical recording medium and its readout method according to the present invention, it is possible to obtain the effect of super resolution with no need of using a readout magnetic field, and notable contribution is made for long-term safety of the recording bits and miniaturization and light-weight of the drives as compared with the conventional super resolution recording media.

Further, by providing a bias layer for generating a magnetic field in a super-resolution magneto-optical recording medium capable of magnetic domain reversal by magnetostatic coupling, there can be obtained more excellent effect of super resolution.

By using the readout method of magneto-optical recording medium according to the present invention, it becomes possible to directly detect differential signals which has been impossible with the prior art, and an improvement of readout signal quality is realized.

EXAMPLES

The present invention is further illustrated below with reference to the examples. These examples, however, are merely intended to be illustrative and not to be construed as limiting the scope of the invention.

EXAMPLE 1

A polycarbonate substrate having a guide groove with a track pitch of 1.6 μm was introduced into a sputtering apparatus and the sputtering apparatus was evacuated to a vacuum below $5\times10^{-5}$ Pa. Thereafter, an 80 nm-thick layer of tantalum oxide was formed on the substrate as a protective layer by reactive sputtering.

On the tantalum oxide layer were similarly formed a 30 nm-readout layer composed of $Gd_{34}(Fe_{80}Co_{20})_{66}$ (the figures in this and the following formulations are "atom %", a 15 nm-cut-off layer composed of $Tb_{20}Fe_{80}$ and a 40 nm-memory layer composed of $Tb_{21}(Fe_{80}CO_{20})_{79}$. Finally, an 80 nm-SiN protective layer was provided.

The Curie temperatures of said readout layer, cut-off layer and memory layer were not less than 300° C., 120° C. and 240° C., respectively. In the readout layer, the magnetization of the rare earth metal was dominant at room temperature, and the compensation temperature was 190° C.

In other layers, the magnetization of the transition metal was dominant at room temperature. The perpendicular magnetic anisotropy of the readout layer was $2\times10^6$ erg/cc at room temperature.

Regarding the readout layer, the coercive force at room temperature was almost zero and the angle of its Kerr rotation at room temperature (θk1) was 0.24 deg. At 120° C., the coercive force was 8,000 A/m, the magnetization was 280 emu/cc and the angle of Kerr rotation (θk2) was 0.34 deg.

The disc produced in the manner described above was subjected to test recording and its C/N ratio was evaluated by an evaluating device adjusted to a wavelength of 780 nm and a numerical aperture of 0.55. Recording was carried out under the conditions of linear velocity=7 m/s, frequency=7 MHz, recording power=9 mW, and recording duty=30%.

After recording, the C/N ratio was measured by changing the readout power Pr with no readout magnetic field applied. It was found that when Pr was raised to not less than 1.6 mW, the signal phase was perfectly reversed and a high C/N ratio was provided. When Pr was 2.0 mW, C/N ratio was 48 dB.

When similar recording was carried out on the adjacent track at 2 MHz, the crosstalk was as low as −33 dB.

Comparative Example 1

The same procedure as Example 1 was carried out except that the readout layer composition was $Gd_{21}(Fe_{80}Co_{20})_{79}$ to produce a disc.

The Curie temperature of the readout layer was not less than 300° C. Also, in this readout layer, the magnetization of the rare earth metal was dominant at room temperature and no compensation temperature existed at and above room temperature.

The coercive force of the readout layer at room temperature was 18,000 A/m and the angle of Kerr rotation θk1 was 0.33. At 120° C., the coercive force of the readout layer was 16,000 A/m, the magnetization was 240 emu/cc and the angle of Kerr rotation θk2 was 0.32. The perpendicular magnetic anisotropy of the readout layer alone at 120° C. was $5\times10^6$ erg/cc.

Thereafter, the C/N ratio was measured at a readout power Pr of 2.0 mW with no readout magnetic field applied under otherwise the same conditions as in Example 1. It was 35 dB. When the readout was conducted by applying a readout magnetic field of 40,000 A/m in the erasing direction, a C/N ratio of 49 dB was obtained. Reversal of signal phase was not observed.

The crosstalk level measured in the same way as Example 1 was −27 dB.

Comparative Example 2

The procedure of Example 1 was followed except for use of a composition of $Gd_{26}(Fe_{80}Co_{20})_{74}$ for the readout layer to produce a disc.

The Curie temperature of the readout layer was above 300° C. Rare earth metal magnetization was dominant at room temperature and the compensation temperature was 90° C. The perpendicular magnetic anisotropy of the readout layer alone at 120° C. was $4\times10^6$ erg/cc.

The coercive force of the readout layer at room temperature was 36,000 A/m and the angle of Kerr rotation θk1 was 0.33. At 120° C., the coercive force was 30,000 A/m, the magnetization was 90 emu/cc and the angle of Kerr rotation θk2 was 0.34.

The C/N ratio measured under the conditions of Example 1 at readout power Pr of 2.0 mW with no readout magnetic field applied was 33 dB.

When readout was conducted by applying a readout magnetic field of 40,000 A/m in the erasing direction, a C/N ratio of 49 dB was obtained. Reversal of signal phase was not observed.

The crosstalk level measured in the same way as Example 1 was −26 dB.

Comparative Example 3

The same procedure as Example 1 was followed except for use of a composition of $Gd_{37}(Fe_{80}Co_{20})_{63}$ for the readout layer to produce a disc.

The Curie temperature of the readout layer was not less than 300° C. Magnetization of the transition metal was dominant at room temperature and no compensation temperature existed at not less than the room temperature. The perpendicular magnetic anisotropy of the readout layer at 120° C. was $4\times10^5$ erg/cc.

The coercive force of the readout layer at room temperature was almost zero and the angle of Kerr rotation θk1 was 0.12. At 120° C., the coercive force was 4,800 A/m, The magnetization was 430 emu/cc and the angle of Kerr rotation θk2 was 0.28.

The C/N ratio measured under the conditions of Example 1 at readout power Pr of 2.0 mW with no readout magnetic field applied was 41 dB although signal phase was reversed.

The crosstalk level measured in the same way as Example 1 was −35 dB.

Comparative Example 4

By following the procedure of Example 1 and using the same substrate, there was produced a disc having a 90 nm-tantalum oxide protective layer, a 28 nm-memory layer composed of $Tb_{21}(Fe_{93}Co_7)_7$, a 30 nm-SiN intermediate layer and a 40 nm-Al reflective layer.

The C/N ratio measured under the conditions of Example 1 at readout power Pr of 2.0 mW with no readout magnetic field applied was 32 dB. Reversal of signal phase was not observed.

The crosstalk level measured in the same way as Example 1 was −27 dB.

EXAMPLE 2–6

A polycarbonate substrate having a 1.4 μm-track pitch guide groove was introduced into a sputtering apparatus and this sputtering apparatus was evacuated to a vacuum not more than $5\times10^{-5}$ Pa. Then an 80 nm-thick protective layer of tantalum oxide was formed on the substrate by reactive sputtering.

On this tantalum oxide layer were similarly formed a 30 nm-thick readout layer composed of $Gd_{33}(Fe_{80}CO_{20})_{67}$ a 15 nm-thick cut-off layer composed of $Tb_{20}Fe_{80}$ and a 40 nm-thick memory layer composed of $Tb_{x1}(Fe_{80}Co_{20})_{100-x1}$.

The composition x1 of Tb of the memory layer was changed as shown in Table 1.

An 80 nm-thick protective layer of SiN was provided on said memory layer.

The Curie temperatures of said readout layer, cut-off layer and memory layer were not less than 300° C., 120° C. and 240° C., respectively.

In the readout layer, the magnetization of the rare earth metal was dominant at room temperature and the compensation temperature was 190° C. In other layers, magnetization of the transition metal was dominant at room temperature.

The coercive force of the readout layer at room temperature was almost zero, the angle of Kerr rotation θk1 was 0.24 deg and the magnetization was 270 emu/cc. At 120° C., the coercive force of the readout layer was 10,000 A/m, the angle of Kerr rotation θk2 was 0.34 deg and the magnetization was 330 emu/cc.

Each of the thus produced discs was subjected to evaluation of CNR (signal-to-noise ratio in narrow band) from light intensity modulation recording by using an evaluating device adjusted to a wavelength of 780 nm and a numerical aperture of 0.55. Recording was carried out under the conditions of linear velocity of 7 m/s, frequency of 7 MHz, recording power of 9 mW and recording duty of 30%.

No magnetic field was applied during readout. When the recording and measurement were carried out by changing the readout power, there took place reversal of the magnetic domain at the high-temperature region, giving rise to super resolution, at a readout power of not less than 1.6 mW.

In the readout signal, there was observed no DC bias component attributable to the "mask" with a uniform magnetization direction such as produced in ordinary FAD super resolution recording.

The magnetic properties of the memory layer and the results of CNR evaluations at a readout power of 2.4 mW are shown collectively in Table 1 (Tb composition dependence of the memory layer).

When a readout magnetic field of 8,000 A/m was applied in the erasing direction in readout of the disc of Example 2, CNR increased by 2.4 dB over the case where no readout magnetic field was applied, and became 45.5 dB.

When the readout magnetic field was raised to 20,000 A/m, CNR was reduced to 37 dB.

The crosstalk level measured by using the disc of Example 4 was −34 dB.

EXAMPLE 7–11

A polycarbonate substrate having a 1.4 μm-track pitch guide groove was introduced into a sputtering apparatus and the sputtering apparatus was evacuated to a vacuum not more than $5\times10^{-5}$ Pa.

Then an 80 nm thick tantalum oxide protective layer was formed on the substrate by reactive sputtering.

On this tantalum oxide protective layer were similarly formed a 30 nm-readout layer composed of $Gd_{x1}(Fe_{80}Co_{20})_{100-x1}$, a 15 nm-cut-off layer composed of $Tb_{20}Fe_{80}$ and a 40 nm-memory layer composed of $Tb_{20.8}(Fe_{80}Co_{20})_{79.2}$.

The composition x of Gd of the readout layer was changed as shown in Table 2. Finally, an 80 nm-protective layer of SiN was provided.

The Curie temperatures of said readout layer, cut-off layer and memory layer were not less than 300° C., 120° C. and 240° C., respectively In the readout layer, magnetization of the rare earth metal was dominant at room temperature and the compensation temperature was 190° C.

In other layers, magnetization of the transition metal wad dominant at room temperature.

Each of the thus produced discs was subjected to evaluation of C/N ratio by using an evaluating adjusted to a wavelength of 780 nm and a numerical aperture of 0.55. Recording was carried out under the conditions of linear velocity was 7 m/s, frequency was 7 MHz, recording power was 9 mW, and recording duty was 30, and measurement was made by changing the readout power. Reversal of the magnetic domain at the high-temperature region occurred, causing super resolution, at a readout power of not less than 1.6 mW.

No magnetic field was applied during readout. The magnetic properties of the memory layer and the results of CNR evaluation at a readout power of 2.4 mW are shown in Table 2 (Gd composition dependence of the readout layer).

The crosstalk measured by using the disc of Example 9 was −36 dB.

TABLE 1

|  | Tb (at. %) | Ms (120° C.) (emu/cc) | Ms (25° C.) (emu/cc) | CNR (dB) |
|---|---|---|---|---|
| Example 2 | 17.8 | 330 | 270 | 43.1 |
| Example 3 | 19.8 | 270 | 210 | 46.8 |
| Example 4 | 21.5 | 180 | 140 | 48.8 |
| Example 5 | 22.5 | 130 | 80 | 47.1 |
| Example 6 | 23.7 | 80 | 50 | 42.3 |

Table 2

|  | Gd (at. %) | Ms (120° C.) (emu/cc) | Ms (25° C.) (emu/cc) | CNR (dB) |
|---|---|---|---|---|
| Example 7 | 30.6 | 160 | 280 | 42.1 |
| Example 8 | 32.4 | 220 | 310 | 46.8 |

Table 2-continued

| | Gd (at. %) | Ms (120° C.) (emu/cc) | Ms (25° C.) (emu/cc) | CNR (dB) |
|---|---|---|---|---|
| Example 9 | 33.2 | 260 | 370 | 48.9 |
| Example 10 | 34.2 | 340 | 420 | 46.8 |
| Example 11 | 34.9 | 380 | 470 | 40.5 |

EXAMPLE 12

A polycarbonate substrate having a guide groove with a track pitch of 1.4 μm was introduced into a sputtering apparatus and this sputtering apparatus was evacuated to a vacuum not more than $5 \times 10^{-5}$ Pa.

Then an 80 nm-thick tantalum oxide layer was formed on the substrate as a protective layer by reactive sputtering.

On this tantalum oxide layer were similarly formed a 30 nm-readout layer composed of $Gd_{34}(Fe_{80}Co_{20})_{66}$, a 15 nm-cut-off layer composed of $Tb_{20}Fe_{80}$, a 20 nm-bias layer composed of $Gd_{18}(Fe_{70}Co_{30})_{82}$ and a 40 nm-memory layer composed of $Tb_{23}(Fe_{80}Co_{20})_{77}$. Finally, a 20 nm-protective layer of SiN was provided on the memory layer.

The Curie temperatures of said readout layer, cut-off layer, bias layer and memory layer were not less than 300° C., 120° C., not less than 300° C. and 240° C., respectively.

In the readout layer, the magnetization of the rare earth metal was dominant at room temperature, and the compensation temperature of this layer was 190° C.

In the cut-off and bias layers, the magnetization of the transition metal was dominant at room temperature.

At room temperature (25° C.), the coercive force of the readout layer was almost zero, the angle of its Kerr rotation θk1 was 0.24 deg and the magnetization was 380 emu/cc. At 120° C., the coercive force of the readout layer was 10,000 A/m, the angle of Kerr rotation θk2 was 0.34 deg and the magnetization was 250 emu/cc.

The magnetization of the bias layer at 120° C. was 390 emu/cc.

Recording was made on a disc produced in the manner described above and its C/N ratio was evaluated by an evaluating device with a numerical aperture of 0.55 at a wavelength of 780 nm. Recording conditions: linear velocity=7 m/s; frequency=9 MHz (mark length: 0.39 μm); recording duty=30%.

After recording, the measurement described above was made by changing the readout power Pr with no readout magnetic field applied. Signal phase was perfectly reversed and a high C/N ratio (signal-to-noise ratio in narrow band) was provided when Pr was raised to not lee than 2.0 mW. At Pr was 2.4 mW, the C/N ratio was 46.5 dB.

When recording was performed on the adjacent track at 2 MHz, the crosstalk was held at −36 dB.

EXAMPLE 13

A polycarbonate substrate having a guide groove with a track pitch of 1.4 μm was placed in a sputtering apparatus and this sputtering apparatus was evacuated to a vacuum not more than 5×10−5 Pa.

Then an 80 nm-tantalum oxide layer was formed on the substrate as a protective layer by reactive sputtering.

On this tantalum oxide layer were formed a 30 nm-readout layer composed of $Gd_{19}(Fe_{80}Co_{20})_{81}$, a 15 nm-cut-off layer composed of $Tb_{20}Fe_{80}$, a 20 nm-bias layer composed of $Gd_{35}(Fe_{70}Co_{30})_{65}$ and a 40 nm-memory layer composed of $Tb_{23}(Fe_{80}Co_{20})_{77}$. Finally, an 80 nm-SiN protective layer was provided on the memory layer.

The Curie temperatures of said readout layer, cut-off layer, bias layer and memory layer were not less than 300° C., 120° C., not less than 300° C. and 240° C., respectively.

The Curie temperature of the memory layer varied slightly depending on the composition, but it was around 240° C.

In the bias layer, magnetization of the rare earth metal was dominant at room temperature (25° C.) and the compensation temperature was 200° C.

In the readout and cut-off layers, magnetization of the transition metal was dominant at room temperature.

The readout layer, at room temperature, had a coercive force of 2,200 A/m, a Kerr rotation angle θk1 of 0.18 deg and a magnetization of 420 emu/cc. At 120° C., the coercive force was 1,600 A/m, the angle of Kerr rotation θk2 was 0.34 deg and the magnetization was 330 emu/cc.

The magnetization of the bias layer at 120° C. was 380 emu/cc.

Recording was made on a disc produced in the manner described above and its C/N ratio was evaluated by an evaluating adjusted to a wavelength of 780 nm and a numerical aperture of 0.55. Recording was carried out under the following conditions: linear velocity=7 m/s; frequency=9 MHz; recording power=9 mW; recording duty=30%.

After recording, measurement was made by changing the readout power Pr with no readout magnetic field applied. When Pr was raised to not less than 2.0 mW, the signal phase was perfectly reversed and a high C/N ratio was obtained. At Pr was 2.4 mW, the C/N ratio was 47.3 dB.

When recording was conducted on the adjacent track at 2 MHz, the crosstalk was as low as −39 dB.

Comparative Example 5

A disc was produced according to the same procedure as Example 12 except that the readout layer composition was $Gd_{26}(Fe_{80}Co_{20})_{74}$ and that no bias layer was provided.

The Curie temperature of the readout layer was not less than 300° C. In this layer, magnetization of the rare earth metal was dominant at room temperature and the compensation temperature was 90° C.

The coercive force of the readout layer at room temperature was 56,000 A/m and the angle of Kerr rotation θk1 was 0.33. At 120° C., the coercive force of the readout layer was 48,000 A/m and the angle of Kerr rotation θk2 was 0.34.

The C/N ratio measured under the same conditions as Example 12 at a readout power Pr of 2.0 mW with no readout magnetic field applied was 28 dB.

When readout was conducted by applying a readout magnetic field of 40,000 A/m in the erasing direction, the C/N ratio was 46.1 dB.

Reversal of signal polarity was not observed. The crosstalk measured in the same way as Example 12 in a readout magnetic field of 40,000 A/m was −23 dB.

Comparative Example 6

A disc having a 90 nm-tantalum oxide protective layer, a 28 nm-memory layer composed of $Tb_{21}d(Fe_{93}Co_7)_{79}$, a 30 nm-SiN intermediate layer and a 40 nm-Al reflective layer was produced by following the same procedure as Example 12 and using a substrate same as used in Example 12.

The C/N ratio of this disc measured under the same conditions as Example 12 at a readout power Pr of 2.0 mW with no readout magnetic field applied was 26 dB.

Reversal of signal phase was not observed. The crosstalk measured in the same way as Example 12 was −25 dB.

EXAMPLE 14

A polycarbonate substrate having a guide groove with a track pitch of 1.4 µm was introduced into a sputtering machine and the machine was evacuated to a vacuum not more than $5 \times 10^{-5}$ Pa. Then an 80 nm-tantalum oxide layer was formed on the substrate as a protective layer by reactive sputtering.

On this tantalum oxide layer were similarly formed a 30 nm-readout layer composed of $Gd_{33}(Fe_{80}CO_{20})_{67}$, a 15 nm-cut-off layer composed of $Tb_{20}Fe_{80}$ and a 40 nm-memory layer composed of $Tb_{23}(Fe_{80}Co_{20})_{77}$. Finally an 80 nm-SiN protective layer was provided.

The obtained disc was subjected to evaluation of CNR (narrow-band signal-to-noise ratio) from light intensity modulation recording by using an evaluating machine adjusted to a wavelength of 780 nm and a numerical aperture of 0.55 ($1/e^2$; diameter: 1.36 µm).

By using this disc, the recording was carried out at a linear velocity of 7 m/s, a recording frequency of 1 MHz and a recording duty of 50%.

When the readout power was changed successively with no readout magnetic field applied, reversal of the magnetic domain started at Pr=1.6 mW, and the signal level at the area other than the ends of the magnetic domain was equalized at Pr=2.3 mW regardless of the direction of the magnetic domain. In this case, a projection was produced on the signal at the portion corresponding to the end of the magnetic domain.

After once erasing the record, recording was conducted at a pulse width of 40 ns, a frequency of 7 MHz and a recording power of 9 mW and then read out at 2.3 mW. The part of the signal corresponding to signal peak in ordinary readout crossed the substantially zero level. Positional detection of the magnetic domain was possible by detecting the position where the readout signal crosses the zero level after it has passed through a high-frequency filter.

The jitter (statistical variation of the detection point) measured by a time interval analyzer was 1.6 ns. As readout was carried on by changing the readout power, a difference was produced in signal level according to the direction of the magnetic domain, but no increase of jitter took place until the difference reached ±12%.

EXAMPLE 15

Recording was carried out with the same disc as used in Example 14 at a linear velocity of 7 m/s, a recording frequency of 4 MHz, a duty of 50% and a recording power of 6 mW, and the record was read out at 2.3 m/W.

Readout signal had upward and downward projections at the portions corresponding to the ends of the magnetic domain. Detection of the magnetic domain ends was possible by subjecting the signal to first order differentiation and then determining the point where the signal crossed the zero level. Jitter was 2.1 ns.

Comparative Example 7

A polycarbonate substrate having a guide groove with a track pitch of 1.4 µm was placed in a sputtering apparatus and then the sputtering apparatus was evacuated to a vacuum not more than $5 \times 10^{-5}$ Pa.

Then an 80 nm-thick tantalum oxide layer was formed on the substrate as a protective layer by reactive sputtering.

On this tantalum oxide layer were formed successively a 30 nm-readout layer composed of $Gd_{24}(Fe_{80}Co_{20})_{76}$ a 15 nm-cut-off layer composed of $Tb_{20}Fe_{80}$ and a 40 nm-memory layer composed of $Tb_{23}(Fe_{80}Co_{20})_{77}$. Finally, an 80 nm-protective layer composed of SiN was provided on the memory layer to make a conventional FAD recording medium.

Recording was carried out with this disc at a linear velocity of 7 m/s, a recording frequency of 7 MHz and a recording pulse width of 40 ns and the same evaluation as in Example 14 was made. Super resolution occurred in a readout magnetic field of not less than 300 Oe and at a readout power of not less than 1.6 mW. When readout was conducted in a readout magnetic field of 500 Oe at a readout power of 2.4 mW, CNR was 48.5 dB.

In this case, although formation of a magnetic domain (mask) oriented in the direction of readout magnetic field was observed, no change of signal waveform incidental to reversal of the magnetic domain by magneto-static coupling was seen.

Readout signal was subjected to first order differentiation and its peak position was determined by detecting the location where the signal crossed the zero slice level. The jitter measured by a time interval analyzer was 2.6 ns.

Comparative Example 8

A polycarbonate substrate having a 1.4 µm-track pitch guide groove was introduced into a sputtering apparatus and this sputtering apparatus was evacuated to a vacuum not more than $5 \times 10^{-5}$ Pa.

Then an 80 nm-tantalum oxide layer was formed on the substrate as a protective layer by reactive sputtering.

On this tantalum oxide layer were formed a 28 nm-memory layer composed of $Tb_{23}(Fe_{80}Co_{20})_{77}$ and a 30 nm-intermediate layer composed of SiN, and finally a 50 nm-Al reflective film was formed to make a recording medium with an ordinary resolving power (non-super resolution).

Recording was made on this disc at a linear velocity of 7 m/s, a recording frequency of 7 MHz and a recording pulse width of 40 ns and the same evaluation as in Example 14 was made. When the record was read out at a readout power of 1.5 mW, CNR was 36.7 dB.

Readout signal was subjected to first order differentiation and its peak position was determined by detecting the location where the signal crossed the zero slice level. The jitter measured by a time interval analyzer was over 20 ns.

What is claimed is:

1. A magneto-optical recording medium comprising a substrate and a magnetic layer comprising at least a readout layer, a cut-off layer and a memory layer disposed on said substrate in that order, wherein said magnetic layer has the property that when said magnetic layer is heated by irradiation from a readout beam, for readout of information without applying any readout magnetic field, a sub-lattice magnetization direction, of said readout layer in said magnetic layer at a high-temperature region, is reversed, relative to the magnetization direction at a pre-irradiation temperature of said region, and when the temperature of said magnetic layer declines after passage of the readout beam, the sub-lattice magnetization direction which existed at said pre-irradiation temperature is restored.

2. A magneto-optical recording medium comprising a substrate and an exchange-coupled magnetic layer comprising at least a readout layer, a cut-off layer and a memory layer disposed on said substrate in that order, each of which is composed of an alloy of a rare earth metal and a transition metal, the Curie temperature of said readout layer, cut-off layer and memory layer satisfying the following relations:

$$T_{c1} > T_{c2} \geq 50° C. \quad (1)$$

$$T_{c3} > T_{c2} \quad (2)$$

wherein $T_{c1}$ represents Curie temperature of the readout layer, $T_{c2}$ represents Curie temperature of the cut-off layer, and $T_{c3}$ represents Curie temperature of the memory layer;

said magnetic layer having the properties that when the magnetic layer is heated to a temperature close to $T_{c2}$ or higher by a readout beam, an exchange coupling force between the memory layer and the readout layer is decreased to or becomes zero and a sub-lattice magnetization direction, of the magnetic layer concerned with readout at the high-temperature region heated to a temperature close to $T_{c2}$ or higher is reversed, relative to the magnetization direction at a pre-irradiation temperature of said region, and when the temperature of the magnetic layer declines after passage of the readout beam, the sub-lattice magnetization direction is restored.

3. A magneto-optical recording medium according to claim 2, wherein the magnetization of the rare earth metal in the readout layer is dominant at $T_{c2}$ and the magnetization of the transition metal in the memory layer is dominant at $T_{c2}$, or the magnetization of the transition metal in the readout layer is dominant at $T_{c2}$ and the magnetization of the rare earth metal in the memory layer is dominant at $T_{c2}$.

4. A magneto-optical recording medium according to claim 2, wherein the compensation temperature ($T_{comp}$) of the readout layer is more than $T_{c2}$.

5. A magneto-optical recording medium according to claim 2, wherein the angle of Kerr rotation of the readout layer at a temperature close to $T_{c2}$ or higher is larger than the angle of Kerr rotation at around room temperature at which the exchange coupling is strong.

6. A magneto-optical recording medium according to claim 2, wherein the readout layer has a coercive force of not less than 2,000 A/m at $T_{c2}$, a perpendicular magnetic anisotropy of $2 \times 10^{-5}$ to $8 \times 10^6$ erg/cc at $T_{c2}$, a magnetization of not less than 100 emu/cc at $T_{c2}$ and a magnetization of not more than 500 erg/cc at room temperature.

7. A magneto-optical recording medium according to claim 2, wherein the readout layer is composed of GdFeCo, GdCo, GdFe, GdDyFe, GdDyCo, GdDyFeCo, GdTbFe, GdTbCo, GdTbFeCo, DyFeCo, DyCo, TbCo, TbFeCo, TbDyFeCo or TbDyCo, the cut-off layer is composed of TbFe, TbFeCo, DyFeCo, DyFe or TbDyFeCo, and the memory layer is composed of TbFeCo, TbCo, DyFeCo, TbDyFeCo, GdTbFe or GdTbFeCo.

8. A magneto-optical recording medium according to claim 2, wherein the thickness of the readout layer is 8 to 500 nm, the thickness of the cut-off layer is 2 to 30 nm, and the thickness of the memory layer is 10 to 50 nm.

9. A magneto-optical recording medium according to claim 2, wherein the Curie temperature of the readout layer is not less than 250° C., the Curie temperature of the cut-off layer is 100° to 180° C. and the Curie temperature of the memory layer is 200° to 280° C.

10. A magneto-optical recording medium according to claim 2, wherein the memory layer has a magnetization of not less than 80 emu/cc at $T_{c2}$, a magnetization of not more than 300 emu/cc at room temperature, and a perpendicular magnetic anisotropy of not less than $2 \times 10^6$ erg/cc.

11. A magneto-optical recording medium according to claim 2, wherein the coercive force of the memory layer is not less than 240 kA/m.

12. A magneto-optical recording medium according to claim 3, wherein the magnetization of the memory layer is not less than 80 emu/cc at $T_{c2}$ and not more than 300 emu/cc at room temperature, and the magnetization of the readout layer is not less than 150 emu/cc at $T_{c2}$ and not more than 500 emu/cc at room temperature.

13. A magneto-optical recording medium according to claim 12, wherein the magnetization of the rare earth metal in the readout layer is dominant at $T_{c2}$ and the magnetization of the transition metal in the memory layer is dominant at $T_{c2}$.

14. A magneto-optical recording medium according to claim 12, wherein the coercive force of the readout layer at $T_{c2}$ is 2,000 to 40,000 A/m, and the coercive force of the memory layer at $T_{c2}$ is not less than 800,000 A/m.

15. A magneto-optical recording medium according to claim 12, wherein the readout layer is composed of an alloy of a rare earth metal and a transition metal represented by the following formula:

$$Gd_x(Fe_yCo_{100-y})_{100-x}$$

wherein $30 \leq x$ (atom %) $\leq 35$, and $0 \leq y$ (atom %) $\leq 100$, and the memory layer is composed of an alloy of a rare earth metal and a transition metal represented by the following formula:

$$Tb_{x1}(Fe_{y1}Co_{100-y1})_{100-x1}$$

wherein $17 \leq x1$ (atom %) $\leq 24$, and $70 \leq y1$ (atom %) $\leq 85$.

16. A magneto-optical recording medium according to claim 2, wherein the magnetic layer comprise at least a readout layer, a cut-off layer, a bias layer and a memory layer disposed on the substrate in order, each of which is composed of an alloy of a rare earth metal and a transition metal, said four layers being exchange-coupled to each other, the Curie temperatures satisfy the following relations:

$$T_{c1} > T_{c2} \geq 50 \quad (1)$$

$$T_{c3} > T_{c2} \quad (2)$$

$$T_{c4} > T_{c2} \quad (3)$$

wherein $T_{c1}$ represents Curie temperature of the readout layer, $T_{c2}$ represents Curie temperature of the cut-off layer, $T_{c3}$ represents Curie temperature of the memory layer, and $T_{c4}$ represents Curie temperature of the bias layer, and the bias layer being exchange-coupled to the memory layer at $T_{c2}$, and the magnetization of the bias layer at $T_{c2}$ is greater than that of the memory layer.

17. A magneto-optical recording medium according to claim 16, wherein the magnetization of the rare earth metal in the memory layer is dominant at $T_{c2}$ and the magnetization of the transition metal in the bias layer is dominant at $T_{c2}$, or the magnetization of the transition metal in the readout layer is dominant at $T_{c2}$ and the magnetization of the rare earth metal in the bias layer is dominant at $T_{c2}$.

18. A magneto-optical recording medium according to claim 16, wherein the magnetization of the bias layer at $T_{c2}$ is 150 to 500 emu/cc.

19. A magneto-optical recording medium according to claim 16, wherein the bias layer is composed of GdFeCo, GdCo, GdFe, GdDyFe, GdDyCo, GdDyFeCo, GdTbFe, GdTbCo, GdTbFeCo, DyFeCo, DyCo, TbCo, TbFeCo, TbDyFeCo or TbDyCo.

20. A magneto-optical recording medium according to claim 16, wherein the thickness of the bias layer is 2 to 50 nm.

21. A magneto-optical recording medium according to claim 16, wherein the Curie temperature of the bias layer is not less than 250° C.

22. A magneto-optical recording medium according to claim 16, wherein the magnetization of the bias layer is 150 to 500 emu/cc, the magnetization of the memory layer is not more than 150 emu/cc at $T_{c2}$ and the perpendicular magnetic anisotropy of the memory layer is not less than $2 \times 10^6$ erg/cc.

23. A magneto-optical recording medium having a substrate and an exchange-coupled magnetic layer comprising at least a readout layer, a cut-off layer and a memory layer disposed on said substrate in that order, each of which is composed of an alloy of a rare earth metal and a transition metal, the Curie temperature of said readout layer, cut-off layer and memory layer satisfying the following relations:

$$T_{c1} > T_{c2} \geq 50° C. \quad (1)$$

$$T_{c3} > T_{c2} \quad (2)$$

wherein $T_{c1}$ represents Curie temperature of the readout layer, $T_{c2}$ represents Curie temperature of the cut-off layer, and $T_{c3}$ represents Curie temperature of the memory layer;

said magnetic layer having the properties that when the magnetic layer is heated to a temperature close to $T_{c2}$ or higher by readout beams, an exchange coupling force, between the memory layer and the readout layer, is decreased to or becomes zero and a sub-lattice magnetization direction, of the magnetic layer concerned with readout at the high-temperature region heated to a temperature close to $T_{c2}$ or higher, is reversed, relative to the magnetization direction at a pre-irradiating temperature of said region, and when the temperature of the magnetic layer declines after passage of the readout beam, the sub-lattice magnetization direction which existed at said pre-irradiation temperature is restored;

the magnetization of the rare earth metal in the readout layer being dominant at $T_{c2}$ and the magnetization of the transition metal in the memory layer being dominant at $T_{c2}$, or the magnetization of the transition metal in the readout layer being dominant at $T_{c2}$ and the magnetization of the rare earth metal in the memory layer being dominant at $T_{c2}$;

the readout layer having a coercive force of not less than 2,000 A/m at $T_{c2}$, a perpendicular magnetic anisotropy of $2 \times 10^{-5}$ to $8 \times 10^6$ erg/cc at $T_{c2}$, a magnetization of not less than 100 emu/cc at $T_{c2}$ and a magnetization not more than 500 erg/cc at room temperature; and the memory layer having a magnetization of not less than 80 emu/cc at $T_{c2}$ and a magnetization of not more than 300 emu/cc at room temperature.

24. A method of recording onto and readout method from a magneto-optical recording medium, which comprises using a magneto-optical recording medium set forth in claim 1 or 2, and irradiating the magneto-optical recording medium using a readout beam without applying a magnetic field so that a sub-lattice magnetization direction, of the layer concerned with readout at the high-temperature region is reversed, relative to the magnetization direction at a pre-irradiation temperature of said region.

25. A method of recording onto and readout method from a magneto-optical recording medium, which comprises using a magneto-optical recording medium set forth in claim 12 or 16, and irradiating the magneto-optical recording medium using a readout beam, so as to cause reversal of a sub-lattice magnetization direction of the readout layer forming a part of the readout section while applying a readout magnetic field of not more than 16,000 A/m or without applying such readout magnetic field.

26. A recording and readout method of magneto-optical recording medium, which comprises reading out information using a magneto-optical recording medium set forth in claim 1 or 2, in which information is stored by upwardly or downwardly directed magnetization, and when a portion of the medium is heated by readout beams and elevated in temperature, the heated region makes Kerr rotation in the direction opposite to that caused at the low temperature of said portion, and when said portion is cooled with passage of readout beams, the original direction of Kerr rotation is restored, and using a readout power capable of generating a substantially equal signal level no matter whether magnetization is upwardly directed or downwardly directed when a magnetic domain covering the whole range of the readout beam spot is read out.

27. A recording and readout method of magneto-optical recording medium according to claim 26, wherein in case information is stored by PPM recording, information is read out by detecting the position where the readout signal crosses the slice level, or in case information is stored by PWM recording, information is read out by detecting the peak position of the signal projection produced at the end of the magnetic domain.

* * * * *